(12) United States Patent
Bourne et al.

(10) Patent No.: US 11,485,168 B2
(45) Date of Patent: Nov. 1, 2022

(54) WHEEL OF A VEHICLE

(71) Applicant: Bayerische Motoren Werke Aktiengesellschaft, Munich (DE)

(72) Inventors: Christopher Bourne, Hallbergmoos (DE); Mike Seidel, Schoeneck (DE); Kurt Walther, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 388 days.

(21) Appl. No.: 16/584,078

(22) Filed: Sep. 26, 2019

(65) Prior Publication Data
US 2020/0016925 A1   Jan. 16, 2020

Related U.S. Application Data

(63) Continuation of application No. PCT/EP2018/053334, filed on Feb. 9, 2018.

(30) Foreign Application Priority Data

Mar. 27, 2017  (DE) .................. 10 2017 205 153.1
Sep. 5, 2017  (DE) .................. 10 2017 215 532.9

(51) Int. Cl.
  *B60B 7/12*   (2006.01)
  *B60B 3/10*   (2006.01)
  *B60B 1/14*   (2006.01)

(52) U.S. Cl.
  CPC .................. *B60B 3/10* (2013.01); *B60B 7/12* (2013.01); *B60B 1/14* (2013.01);
  (Continued)

(58) Field of Classification Search
  CPC .... B60B 1/14; B60B 1/06; B60B 7/12; B60B 7/06; B60B 7/0086; B60B 3/10;
  (Continued)

(56) References Cited

U.S. PATENT DOCUMENTS

3,336,084 A * 8/1967 Fenton ...................... B60B 7/00
                                                    301/108.1
2004/0160114 A1  8/2004 Seidner
(Continued)

FOREIGN PATENT DOCUMENTS

CN       2119345 U     10/1992
CN     101378914 A      3/2009
(Continued)

OTHER PUBLICATIONS

International Search Report (PCT/ISA/210) issued in PCT Application No. PCT/EP2018/053334 dated Jul. 10, 2018 with English translation (eight (8) pages).

(Continued)

*Primary Examiner* — Jason R Bellinger
*Assistant Examiner* — Emily G. Castonguay
(74) *Attorney, Agent, or Firm* — Crowell & Moring LLP

(57) ABSTRACT

A wheel of a vehicle, in particular a motor vehicle, has a rim, a hub portion, and at least two spokes connecting the hub portion to the rim. At least two adjoining spokes are connected to each other by at least one connecting web which is arranged in a space between the spokes, is not attached to the rim and the hub portion, and extends at least approximately in the circumferential direction of the wheel.

9 Claims, 2 Drawing Sheets

(52) U.S. Cl.
CPC . *B60B 2900/111* (2013.01); *B60B 2900/1216* (2013.01); *B60B 2900/133* (2013.01); *B60B 2900/311* (2013.01); *B60B 2900/513* (2013.01)

(58) Field of Classification Search
CPC ................ B60B 3/12; B60B 2900/111; B60B 2900/1216; B60B 2900/133; B60B 2900/311; B60B 2900/513; B60B 19/10
See application file for complete search history.

(56) References Cited

U.S. PATENT DOCUMENTS

| | | | | |
|---|---|---|---|---|
| 2004/0262981 | A1* | 12/2004 | Fitzgerald | B60B 7/065 |
| | | | | 301/37.101 |
| 2010/0133894 | A1 | 6/2010 | Takeda et al. | |
| 2011/0309670 | A1* | 12/2011 | Taylor | B60B 3/10 |
| | | | | 301/64.101 |
| 2013/0020856 | A1* | 1/2013 | Dick | B60B 7/04 |
| | | | | 301/37.107 |
| 2016/0288564 | A1* | 10/2016 | Ishikawa | B60B 7/12 |
| 2017/0058993 | A1 | 3/2017 | Lim | |
| 2018/0065407 | A1* | 3/2018 | Heck | B60B 7/0086 |

FOREIGN PATENT DOCUMENTS

| | | | | |
|---|---|---|---|---|
| CN | 105034683 | A | 11/2015 | |
| CN | 106476529 | A | 3/2017 | |
| DE | 202009013418 | U1 * | 2/2011 | ............... B60B 3/10 |
| DE | 102011114664 | A1 * | 4/2012 | ............... B60B 7/01 |
| EP | 1 980 419 | A1 | 10/2008 | |
| JP | 2002-205502 | A | 7/2002 | |
| JP | 2009-119955 | A | 6/2009 | |
| JP | 2015-98207 | A | 5/2015 | |
| WO | WO 2009/029740 | A1 | 3/2009 | |

OTHER PUBLICATIONS

German-language Written Opinion (PCT/ISA/237) issued in PCT Application No. PCT/EP2018/053334 dated Jul. 10, 2018 (four (4) pages).

German-language Office Action issued in counterpart German Application No. 10 2017 205 153.1 dated Nov. 29, 2017 (four (4) pages).

Screenshot of Youtube—Videos, "Bmw F80 M3 Adam_7r Rotiform YVR& Michelin Super Sport Tyres (EP12)," on http://www.youtube.com/watch?v=KrLht5IIQI, uploaded on Mar. 16, 2017 (one (1) page).

Chinese-language Office Action issued in Chinese Application No. 201880013515.1 dated May 7, 2022 with English translation (14 pages).

* cited by examiner

WHEEL OF A VEHICLE

CROSS REFERENCE TO RELATED APPLICATIONS

This application is a continuation of PCT International Application No. PCT/EP2018/053334, filed Feb. 9, 2018, which claims priority under 35 U.S.C. § 119 from German Patent Applications Nos. 10 2017 205 153.1, filed Mar. 27, 2017, and 10 2017 215 532.9, filed Sep. 5, 2017, the entire disclosures of which are herein expressly incorporated by reference.

BACKGROUND AND SUMMARY OF THE INVENTION

The invention relates to a wheel of a vehicle, in particular of a motor vehicle having a rim, a hub section and at least two spokes which connect the hub section to the rim. With respect to the prior art, reference is made by way of example to EP 1 980 419 A1.

There are a very wide variety of requirements for wheels of vehicles, in particular those of passenger cars. In addition to a sufficient strength with a low weight, the wheels are to be beneficial to a satisfactory drag coefficient of the vehicle and are to be distinguished by a pleasing visual appearance. This also includes the fact that the visible outer region of the wheels is made dirty only to a small extent as a result of the abrasion of the wheel brake which is provided on the inner side (that is to say, the side which faces the vehicle) of the wheels. In order to ensure the latter, in particular, it is known to cover the clearances between all the spokes of a wheel by means of a single disk-shaped covering element which is provided on the inner side of the wheel, opposite the brake disk of the wheel brake, which brake disk rotates together with the wheel. In addition, covering elements are also known which cover the spoke intermediate spaces individually.

EP 1 980 419 A1 has disclosed, for example, a wheel of a vehicle, in the case of which wheel decorative elements or covering elements are arranged between the spokes of the wheel. Here, the decorative elements are connected to a hub of the wheel and a rim of the wheel via, for example, screw connections.

In addition to the abovementioned aerodynamic requirements, it is desirable, moreover, for the wheels of a vehicle to be provided with a wheel with as reduced a weight as possible for the purposes of lightweight design and the associated fuel savings. It is worthwhile here for the spokes of the wheel to be configured to be as thin or low in material as possible. The possibilities of material savings on the spokes are limited, however, for strength and rigidity reasons, and also for acoustic reasons. There is a conflict of objectives between acoustic tuning and rigidity, and strength and the lightweight design concept with an aerodynamically improved wheel.

It is therefore an object of the invention to provide a wheel of a vehicle, which wheel solves the abovementioned conflict of objectives and which complies with both the acoustic requirements, the aerodynamic requirements and the requirements with regard to weight, and also with regard to strength and rigidity.

A wheel of a vehicle, in particular of a two-track motor vehicle, is provided, which wheel comprises a rim, a hub section and at least two spokes which connect the hub section to the rim. At least two spokes which are adjacent to one another are connected to one another by way of at least one web which is arranged in a spoke intermediate space, is detached from the rim and the hub section, and runs at least approximately in the circumferential direction of the wheel.

As has already been mentioned, the web is detached spatially from the rim and also from the hub section, that is to say the web connects merely the spokes to one another and is not configured as an extension or as a projection of the rim or of the hub section. This has the advantage that the wheel per se (that is to say neither the rim section nor the hub section and, depending on the configuration, also the spokes) has to be changed, and a conventional wheel (within the context of a kit solution and within the context of a reduced variety of variants) can be used for the abovementioned invention.

A web (also called a bridge) according to the invention between at least two spokes, preferably between each spoke which is adjoining and is arranged in the wheel, makes acoustic damping or decoupling possible. Here, in particular, the effect known to a person skilled in the art of strumming/creaking is addressed. Here, in the case of certain brake excitations, in particular in the case of the release of the brake from a standstill, the spokes act in a similar manner to a tuning fork, the spokes oscillating in such a way that an unpleasant noise which is audible to the driver is produced. The web according to the invention between the spokes makes damping of said oscillation possible, with the result that said strumming/creaking is reduced or eliminated.

In addition to the acoustic advantages, said web likewise provides rigidity and strength advantages. The web which connects the spokes can thus at the same time be a reinforcing element of the spokes. For the purposes of the weight reduction, it is then possible to configure the web with as low a weight as possible as a reinforcing element and at the same time to configure the spokes to be thinner and therefore with less material and in a manner which saves more weight.

In one advantageous embodiment of the invention, the web and the at least two spokes which the web connects are produced as a common component. For example, the web and the spokes or the entire wheel can be produced jointly in a casting or forging process. It is likewise contemplated that the wheel or the spokes and the web is/are milled from a whole piece. An embodiment of the web as a common component with the spokes has the advantage, in particular, that no subsequent joining process is necessary.

As an alternative, the web can also be connected subsequently as a separate component to the spokes in a joining method or joining process. For instance, the web can be connected to the adjoining spokes in a non-positive manner, that is to say, for example, by a screw connection, and/or in a positively locking manner, that is to say, for example, by way of clip connections, and/or in an integrally joined manner, that is to say, for example, by way of an adhesive bond or weld. A releasable connection of this type of the web to the spokes in turn has the advantage that the web can be dismantled at any time.

Here, the web as a connection of the adjoining spokes is connected to the spokes, in particular, on that side of the spokes which faces the vehicle.

Furthermore, it is particularly preferred that the respectively adjoining spokes are supported against one another via the web, and the web is therefore suitable as a reinforcing element and/or as a damping element with regard to acoustic oscillations. As a result, depending on the embodiment of the web itself, a targeted wheel rigidity and a breaking load can be set. During normal operation of the vehicle, a wheel of this type has a stabilizing effect, whereas, for example in what is known as a "small overlap crash case", in the case of which it is a frontal impact with an overlap of the vehicle front with the obstacle of approximately 25%, a wheel which is reinforced by way of a web of this type can act as a targeted predetermined break point in the case of a crash. This is because the smaller the overlap is in the case of a crash, the more directly the forces are introduced from the wheel into the passenger compartment.

Furthermore, the wheel according to the invention comprises at least one covering element. Here, the covering element is an element which is arranged in at least one spoke intermediate space between the spokes and/or covers the spoke intermediate space at least partially and is predominantly flat. Here, the covering element can cover the entire spoke intermediate space or only parts thereof, for example only an outer (as viewed from the wheel center point) circular ring segment of the spoke intermediate space. It is appropriate here from an aerodynamic viewpoint, in particular, to cover an area of the spoke intermediate space which is further away from the wheel center point, since the highest losses with regard to the air resistance are produced, in particular, in the outer regions of the wheel. It is possible by way of a covering of this type to reduce the air resistance and therefore the energy consumption of the vehicle.

It is likewise possible, however, that the covering element is configured in such a way that it covers the entire spoke intermediate space.

The covering element is preferably configured from a plastic material or a metal/plastic layer structure.

It is provided in a further preferred embodiment of the invention that the covering element is fastened to the web. In addition to the reinforcing and acoustic optimization (therefore as a reinforcing element and as a damping element), the web therefore also serves as a fastening element for at least one covering element. The covering element or elements can be connected to the web or fastened to it, for example, in a non-positive manner, that is to say, for example, in the form of screw connections, or in a positively locking manner, for example as clip connections, or else in an integrally joined manner, that is to say, for example, as a weld or an adhesive bond. Bolt or pin connections are likewise possible.

If, for example, as has already been described in one embodiment, the web is connected releasably to the spokes, the web and the covering element can be removed or dismantled from the wheel as needed. In the case of damage of the web or the covering element, a simple replacement is possible in a simple way as a result.

Here, the web preferably comprises at least one receptacle device, for example a through bore or a clip or the like, for receiving the covering element or a plurality of covering elements.

It is likewise preferred that the covering element itself has a receptacle or connecting possibility, for example a clip or a shaped hole, in order to be fastened to the web or to receive the latter.

Here, the covering element does not necessarily have to be held on the wheel exclusively by way of the connection to the web. It is possible, for example, to possibly also support the covering element at other points on the spokes or the rim or the hub section or to fasten it to them.

It is provided in a further possible embodiment of the invention that the web is a spring ring which has a reinforcing action and/or supports the at least two adjoining spokes against one another and extends over the entire circumference on that side of the spokes which faces the vehicle. Here, the spring ring is preferably attached to the spokes in such a way that it supports the respectively adjoining spokes against one another and therefore has a reinforcing and/or particularly preferably oscillation-damping action.

It is then possible, furthermore, to fasten the covering element to the wheel by way of the spring ring. Thus, the covering element can then be connected to the spring ring, for example, in a non-positive or positively locking manner, or can be connected in the course of an assembly method.

It is provided in a further preferred embodiment of the invention that the inner side of the web, that is to say that side or face of the web which is oriented in the direction of the vehicle, comprises or has cooling fins or cooling ducts. The cooling fins preferably run (in their longitudinal direction) in the radial direction of the wheel. A course of this type is particularly preferable, since a high heat dissipation can be facilitated. Here, the heat to be dissipated is produced by way of a braking operation, in the case of which a friction body is pressed against brake disks and this friction is converted mostly into heat.

The cooling fins can be realized, for example, by way of subsequent machining of the web. It is also possible, however, to realize the cooling action by way of ducts in the web.

It is the background of an arrangement of this type of cooling fins or cooling ducts that a greater heat build-up coming from the brake and/or the brake disk is associated with the degree of closure of the spoke intermediate space by way of the covering element. A conflict of objectives is produced from a higher degree of closure and therefore an aerodynamically improved construction with an optimum brake cooling action and/or heat dissipation. The cooling fins serve as a solution approach for improving said conflict of objectives, by the cooling fins conducting the heat which is associated with the brake disk in the direction of the uncovered spoke intermediate space, for example.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
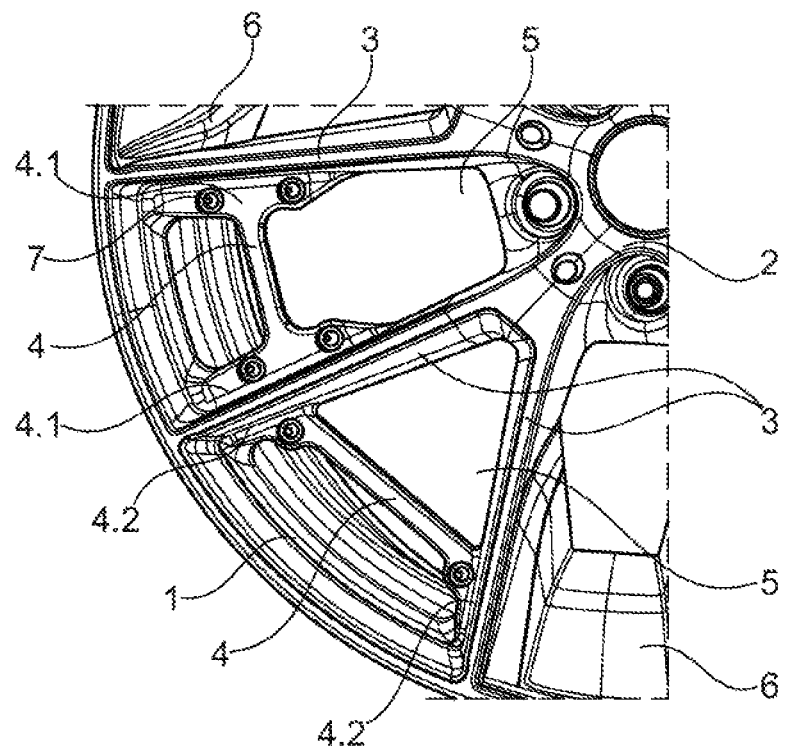
FIG. 1 diagrammatically shows one exemplary embodiment of a part of a wheel according to the invention in a three-dimensional view of the wheel from the outside.

FIG. 1 shows a detail of a vehicle wheel which has a rim 1, a hub section 2 and three spokes 3 which connect the hub section 2 to the rim 1. Here, the vehicle wheel is shown from the front view or from the side which can be seen from the outside in a side view of the vehicle in the installed state. Here, a web 4 connects the respective mutually adjoining spokes 3. The web 4 runs at least approximately in the circumferential direction of the wheel or runs in the direction of a tangent line to a circle (of a defined diameter) of the wheel. Moreover, the web 4 is detached from the rim 1, that is to say is not connected directly to the rim 1, but rather is connected merely to the spokes 3.

Figure 2:
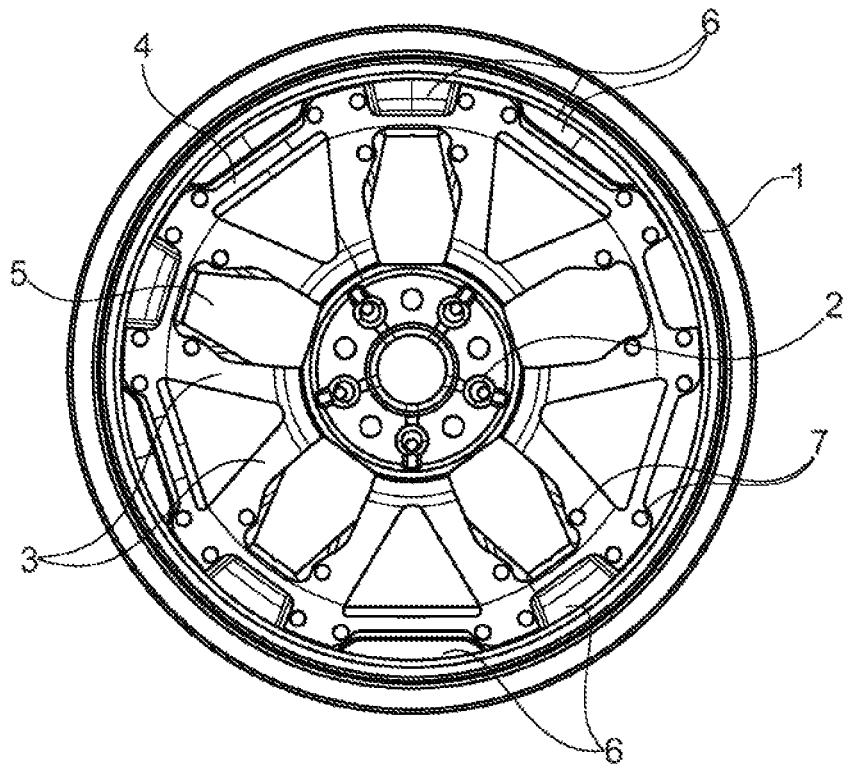
FIG. 2 shows one embodiment of a wheel according to the invention in a view of the wheel from the inside.

In this specific example, the web(s) 4 form a common component with the spokes 3, which component was manufactured in a common production process, in particular a casting or forging method. FIG. 2 shows a detailed illustration in this regard, in which an entire wheel is shown in a rear view or from the side which points in the direction of the vehicle in the installed state of the wheel. Here, in particular, the common component which comprises both the spokes 3 and webs 4 which connect them can be seen.

Here, the webs 4 (from FIG. 1 and FIG. 2) are arranged in each case in such a way that they support the respectively adjoining spokes 3 against one another and thus serve as a reinforcing element and also as a vibration damper. Depending on the requirements with regard to strength and vibration damping, the web 4 (as can be seen in FIG. 1) can be configured either to be flatter and with more material on its edge regions 4.1, or can comprise slimmer edge regions 4.2 and can be configured with a more reduced weight as a result.

Figure 3:
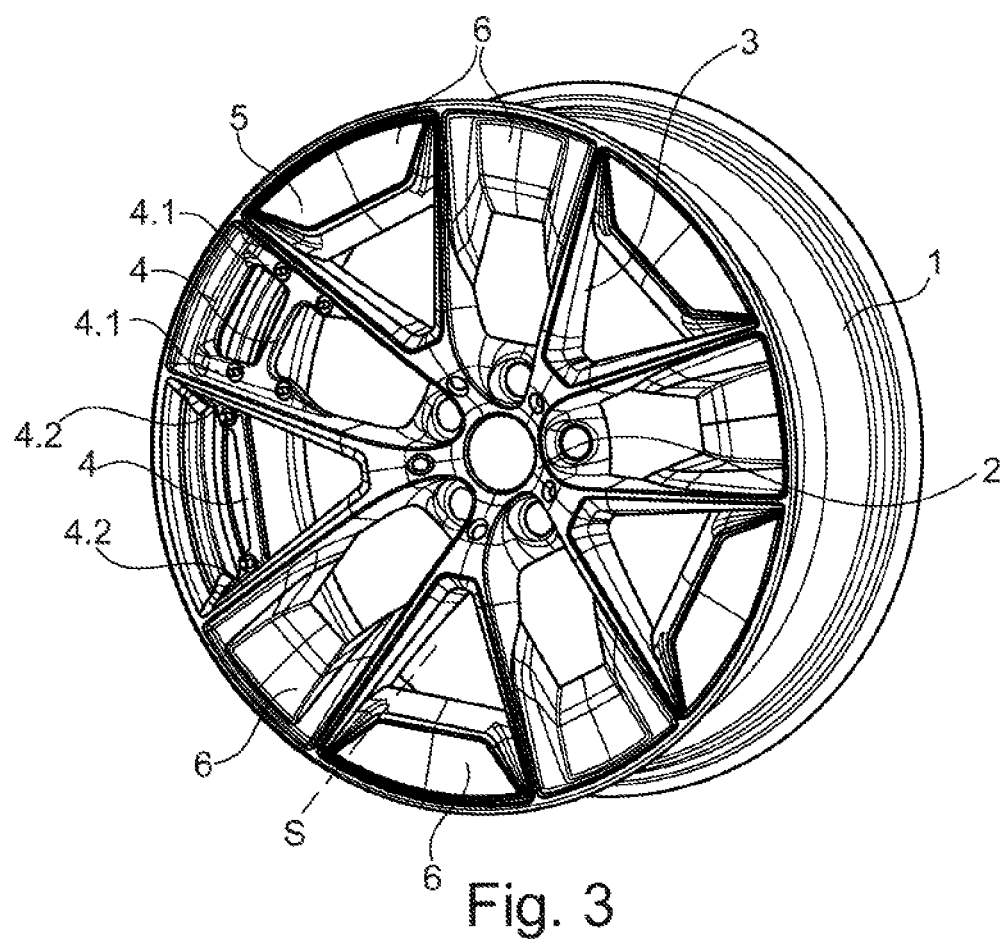
FIG. 3 shows by way of example a wheel according to the invention in a three-dimensional view, which wheel is configured at least partially with covering elements.

It is provided, furthermore, that at least one spoke intermediate space 5 is covered at least partially by a predominantly flat covering element 6. A covering element 6 of this type is indicated in FIG. 1 and FIG. 2, but can be seen more clearly in FIG. 3. FIG. 3 shows the entire wheel from FIG. 1 in a three-dimensional view. The covering element 6 or the covering elements 6 between the spokes 3, that is to say in the spoke intermediate spaces 5, serves/serve, in particular, for the aerodynamic optimization and therefore the reduction of air resistances and the fuel consumption of the vehicle.

The covering elements 6 are fastened to the webs 4 by way of screw connections 7. In this way, in addition to reinforcing and vibration damping, the webs 4 also serve as fastening elements for the covering elements 6.

Here, the covering element 6 can be attached by way of one or more screw connections 7, depending on the required strength of the connection to the web 4. Here, in the connected state, the covering element 6 covers the web 4 in such a way that, in the installed state of the wheel, the web 4 can no longer be seen in an (outer) side view of the vehicle.

This has the advantage, in particular, that the covering elements do not have to come into contact with the rim 1, the spokes 3 or the hub section 2, and therefore no forces are dissipated or absorbed via the covering element 6, and the covering element 6 is subjected to lower loads as a result of a certain amount of play. The covering element 6 can thus be configured from a light, low-weight material, such as a plastic or a metal-plastic layer assembly.

Figure 4:
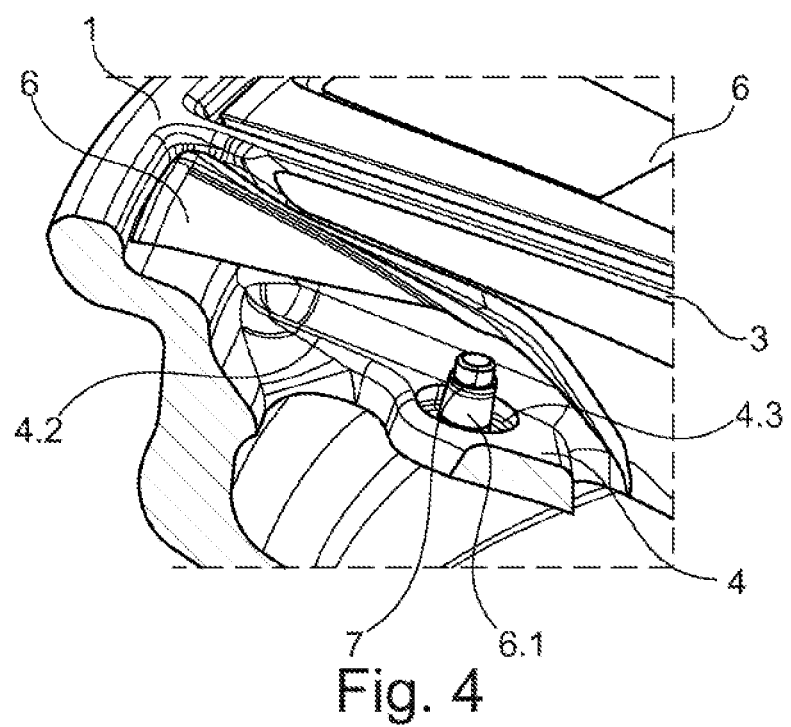
FIG. 4 shows a sectional view through a web and a covering element which is fastened to the latter, in a three-dimensional view.

FIG. 4 shows a detailed sectional view S (cf. FIG. 3) through the rim 1, the attachment or the connection of the covering element 6 to the web 4 being shown, in particular. Here, a receptacle 4.3 or a through bore for leading through a fastening element, for example a screw 7, is provided in the web 4, whereas the covering element comprises a bushing 6.1 for receiving the screw 7. Here, the bushing 6.1 has already been attached to the covering element 6 in the manufacturing process, for example in an injection molding process.

List of Designations
1 Rim
2 Hub section
3 Spoke
4 Web
4.1 Edge region of the web
4.2 Edge region of the web
4.3 Receptacle
5 Spoke intermediate space
6 Covering element
6.1 Bushing
7 Screw connection
S Section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A wheel of a vehicle, comprising: a rim; a hub section; at least two spokes which connect the hub section to the rim; at least one web connecting two adjacent ones of the at least two spokes, wherein the at least one web is arranged in a spoke intermediate space between the two adjacent ones of the at least two spokes in a region closer to the rim than to the hub section, connections of the at least one web to the two adjacent ones of the at least two spokes are located in a region between the rim and the hub section, the at least one web runs at least approximately in a circumferential direction of the wheel, a portion of the at least one web which extends circumferentially between the two adjacent ones of the at least two spokes is located entirely within the region closer to the rim than the hub section, and a predominantly flat covering element configured to cover the at least one spoke intermediate space between the two adjacent ones of the at least two spokes.

2. The wheel according to claim 1, wherein
the at least one web is connected to the adjacent ones of the at least two spokes in an integrally joined manner.

3. The wheel according to claim 1, wherein
the at least one web supports the adjacent ones of the at least two spokes against one another.

4. The wheel according to claim 1, wherein
the at least one web is connected to at least one covering element in a non-positive locking manner.

5. The wheel according to claim 1, wherein
the at least one covering element is produced at least partially from a plastic.

6. A wheel of a vehicle, comprising:
a rim;
a hub section;
at least two spokes which connect the hub section to the rim;
at least one web connecting two adjacent ones of the at least two spokes,
wherein
the at least one web is arranged in a spoke intermediate space between the two adjacent ones of the at least two spokes in a region closer to the rim than to the hub section,
connections of the at least one web to the two adjacent ones of the at least two spokes are located in a region between the rim and the hub section,
the at least one web runs at least approximately in a circumferential direction of the wheel,
a predominantly flat covering element configured to cover the at least one spoke intermediate space between the two adjacent ones of the at least two spokes, and
the at least one web and the adjacent ones of the at least two spokes are formed as a single component.

7. A wheel of a vehicle, comprising:
a rim;
a hub section;
at least two spokes which connect the hub section to the rim;
at least one web connecting two adjacent ones of the at least two spokes,
wherein
the at least one web is arranged in a spoke intermediate space between the two adjacent ones of the at least two spokes in a region closer to the rim than to the hub section,
connections of the at least one web to the two adjacent ones of the at least two spokes are located in a region between the rim and the hub section,
the at least one web runs at least approximately in a circumferential direction of the wheel,
a predominantly flat covering element configured to cover the at least one spoke intermediate space between the two adjacent ones of the at least two spokes,
the at least one web is connected to at least one covering element in a non-positive locking manner, and
the covering element and the at least one web are connected to one another by way of a screw connection.

8. A wheel of a vehicle, comprising:
a rim;
a hub section;
at least two spokes which connect the hub section to the rim;
at least one web connecting two adjacent ones of the at least two spokes,
wherein
the at least one web is arranged in a spoke intermediate space between the two adjacent ones of the at least two spokes in a region closer to the rim than to the hub section,
connections of the at least one web to the two adjacent ones of the at least two spokes are located in a region between the rim and the hub section,
the at least one web runs at least approximately in a circumferential direction of the wheel,
a predominantly flat covering element configured to cover the at least one spoke intermediate space between the two adjacent ones of the at least two spokes, and
the at least one web comprises at least one receptacle device for receiving the covering element.

9. A wheel of a vehicle, comprising:
a rim;
a hub section;
at least two spokes which connect the hub section to the rim;
at least one web connecting two adjacent ones of the at least two spokes,
wherein
the at least one web is arranged in a spoke intermediate space between the two adjacent ones of the at least two spokes in a region closer to the rim than to the hub section,
connections of the at least one web to the two adjacent ones of the at least two spokes are located in a region between the rim and the hub section,
the at least one web runs at least approximately in a circumferential direction of the wheel,
a predominantly flat covering element configured to cover the at least one spoke intermediate space between the two adjacent ones of the at least two spokes, and
the at least one covering element comprises a receptacle device for receiving the at least one web.

* * * * *